No. 837,722. PATENTED DEC. 4, 1906.
J. POST.
MOTOR VEHICLE.
APPLICATION FILED JAN. 26, 1906.

7 SHEETS—SHEET 1.

Witnesses
Inventor
John Post
By James K. Polk
Attorney

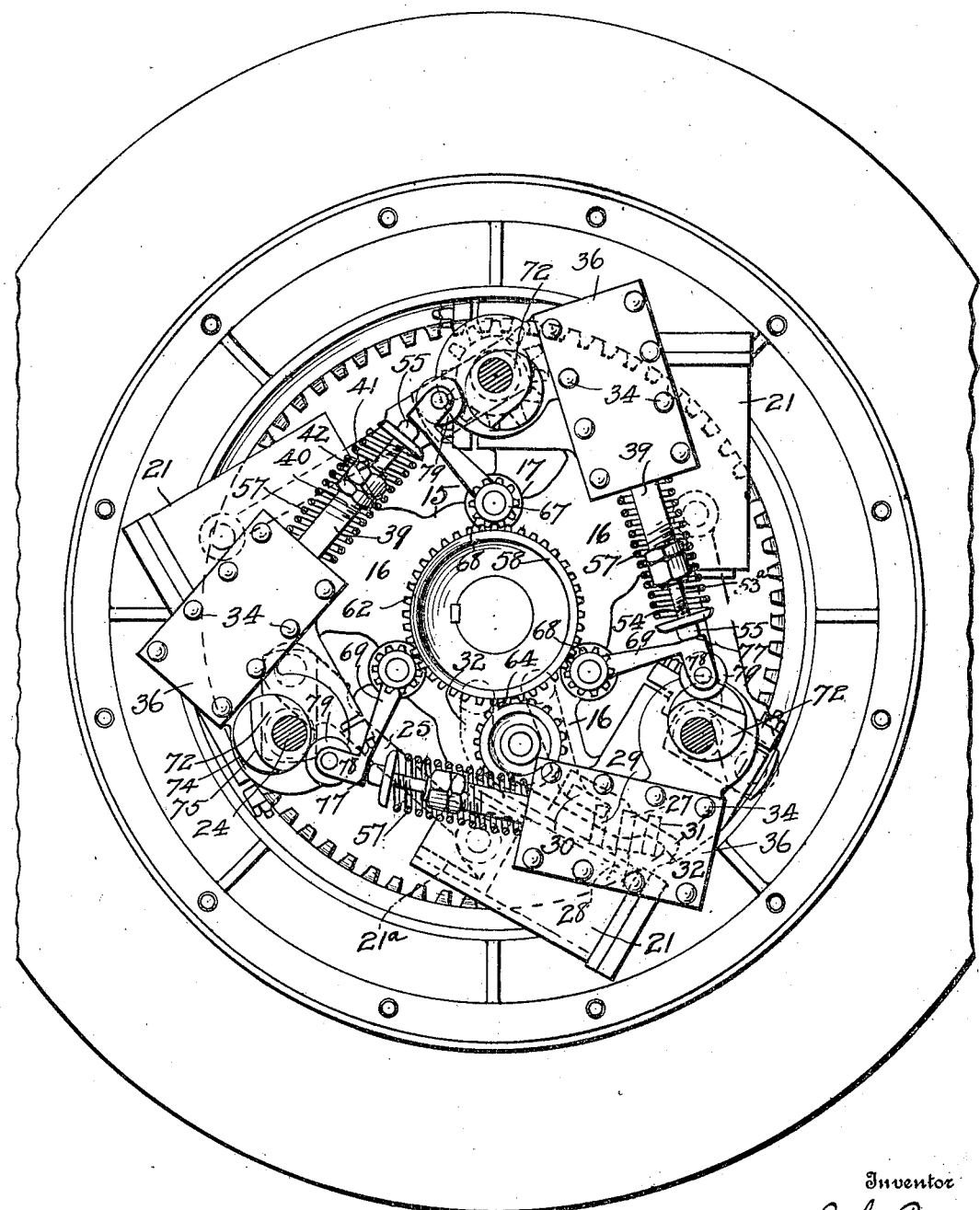

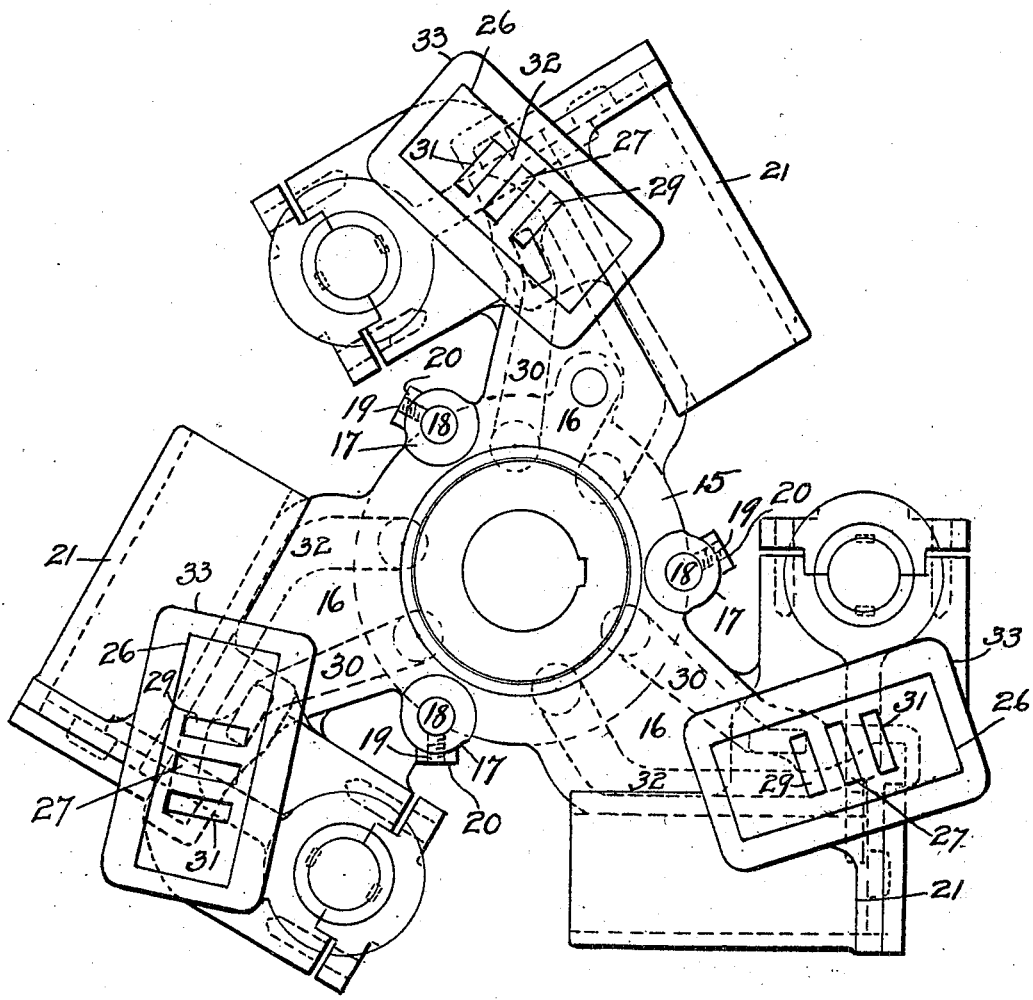

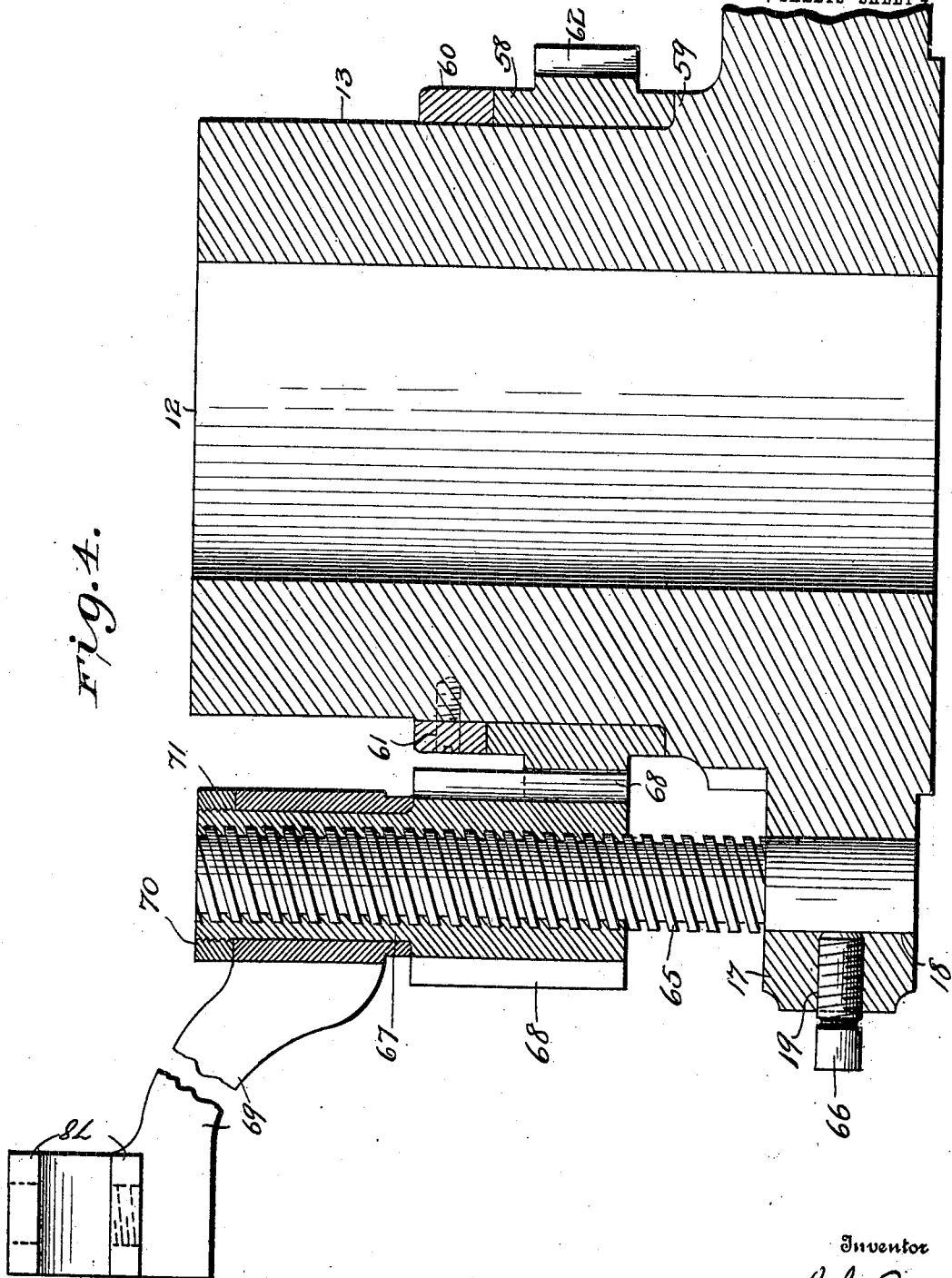

No. 837,722. PATENTED DEC. 4, 1906.
J. POST.
MOTOR VEHICLE.
APPLICATION FILED JAN. 26, 1906.
7 SHEETS—SHEET 5.
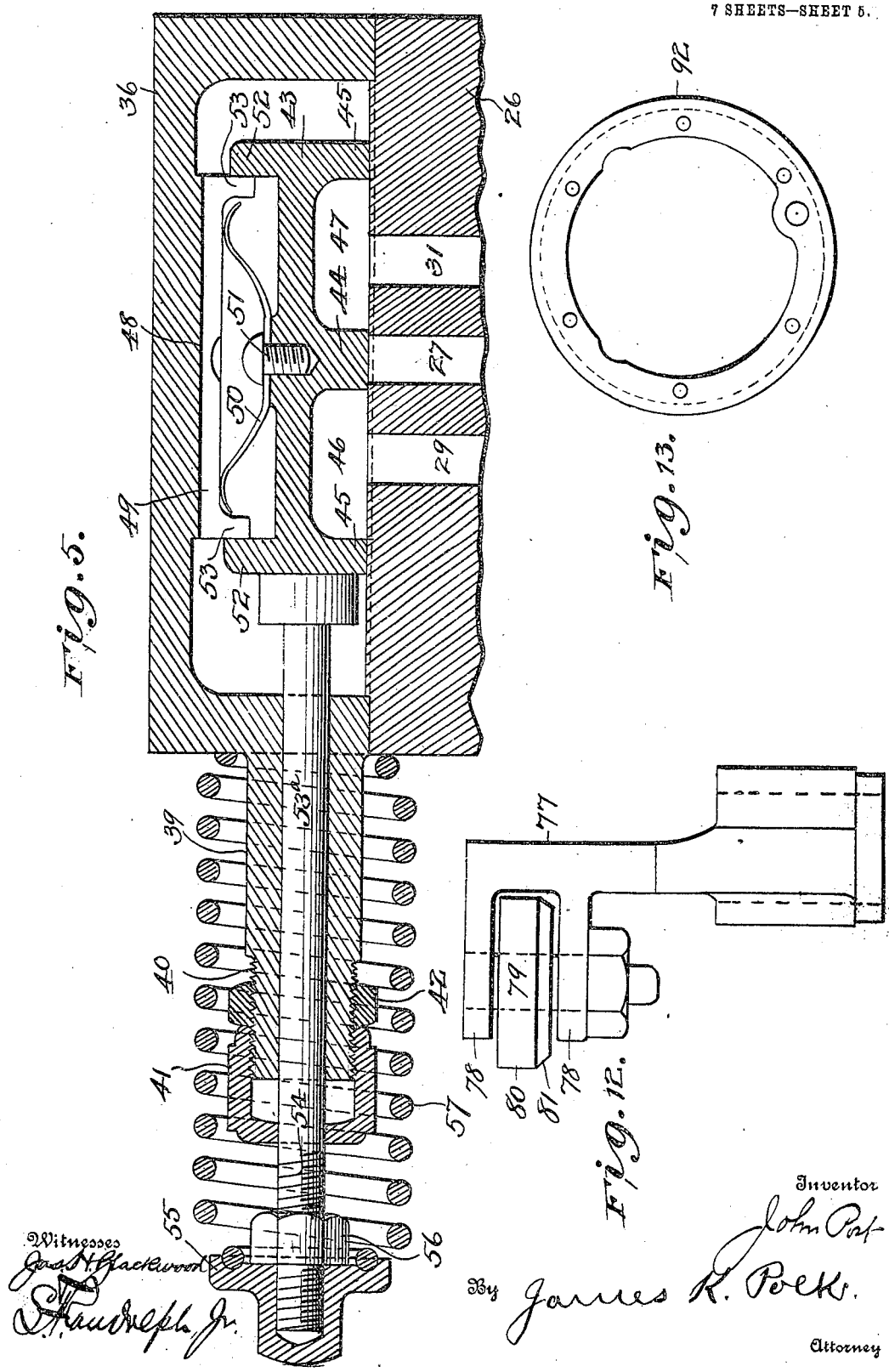

No. 837,722. PATENTED DEC. 4, 1906.
J. POST.
MOTOR VEHICLE.
APPLICATION FILED JAN. 26, 1906.
7 SHEETS—SHEET 6.
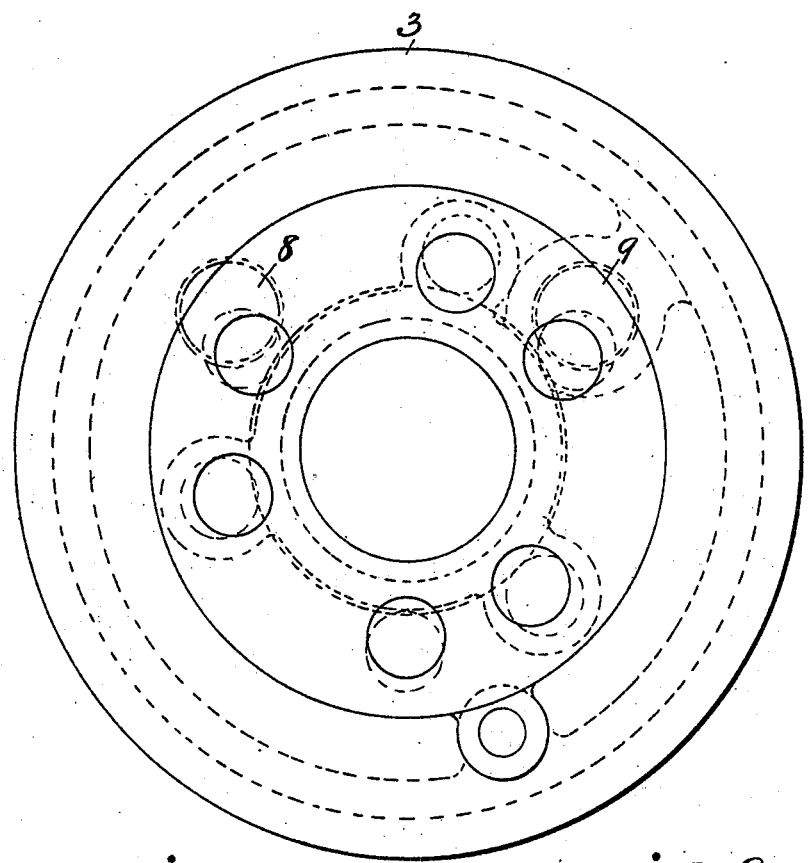
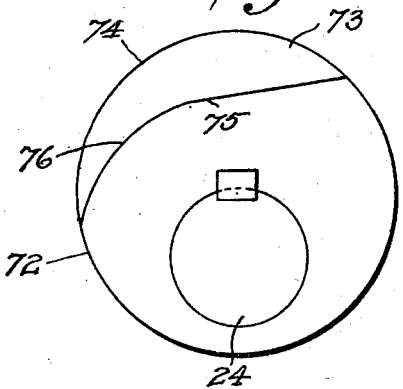
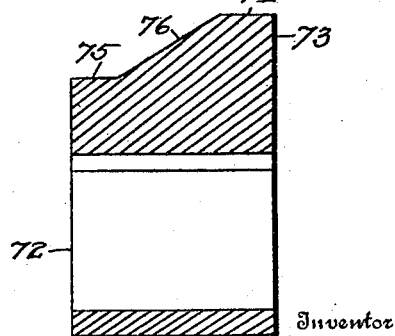
Witnesses
Jas. H. Blackwood
S. Randolph Jr.
Inventor
John Post
By James K. Polk
Attorney No. 837,722. PATENTED DEC. 4, 1906.
J. POST.
MOTOR VEHICLE.
APPLICATION FILED JAN. 26, 1906.

7 SHEETS—SHEET 7.

UNITED STATES PATENT OFFICE.

JOHN POST, OF PHILADELPHIA, PENNSYLVANIA, ASSIGNOR TO GENERAL TRACTION COMPANY, OF WASHINGTON, DISTRICT OF COLUMBIA, A CORPORATION OF THE DISTRICT OF COLUMBIA.

MOTOR-VEHICLE.

No. 837,722.  Specification of Letters Patent.  Patented Dec. 4, 1906.

Application filed January 26, 1906. Serial No. 298,065.

*To all whom it may concern:*

Be it known that I, JOHN POST, a citizen of the United States, and a resident of Philadelphia, in the county of Philadelphia and State of Pennsylvania, have invented certain new and useful Improvements in Motors for Vehicles, of which the following is a full and complete specification.

My invention relates to motors for propelling wheeled vehicles; and it has for its principal object the construction of a motor secured to the axles of the vehicle and contained inside of the wheel made hollow to contain it and geared thereto, so that a portion of the wheel-casing only rotates, the motor and a portion of the wheel-casing remaining stationary.

Another object of my invention is the provision of a motor comprising a plurality of engines so constructed and connected with one another that the individual engines are driven in turn, thus making a perfectly-balanced motor and avoiding the jarring incident to the operation of a single engine, while the machinery operated is given a constant movement.

Another object of my invention is the inclosure of the wheel-casing so as to make it liquid-tight, so that it may be filled with a lubricant to keep the wheel-bearings, gears, cylinders, and all moving parts lubricated, and thus dispense with the necessity of providing lubricators for the individual bearings.

These and other objects as well as the construction of my invention will be described in detail hereinafter, and the construction of my invention will be found illustrated in the accompanying drawings, in which—

Figure 1:
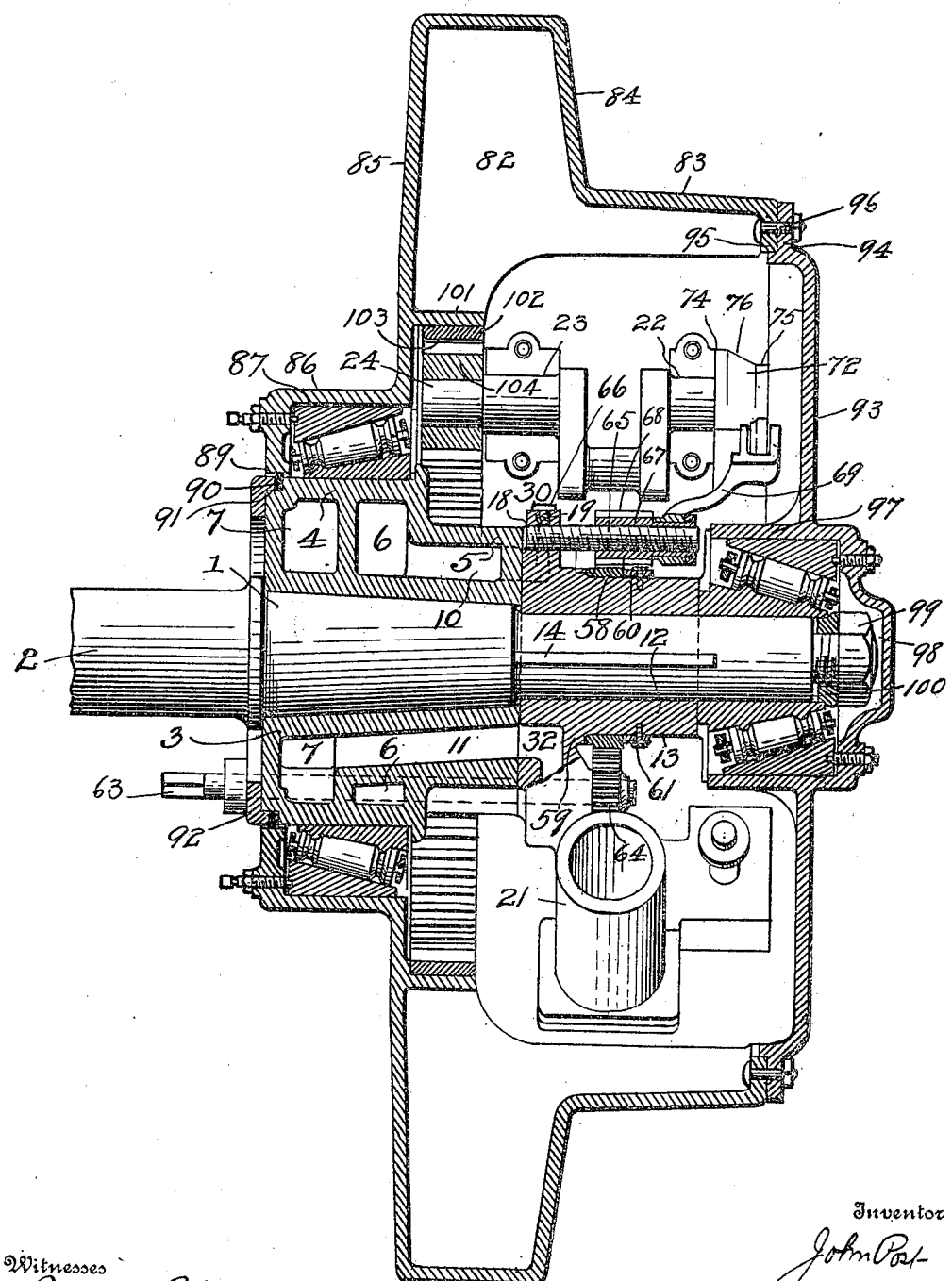
Figure 7:
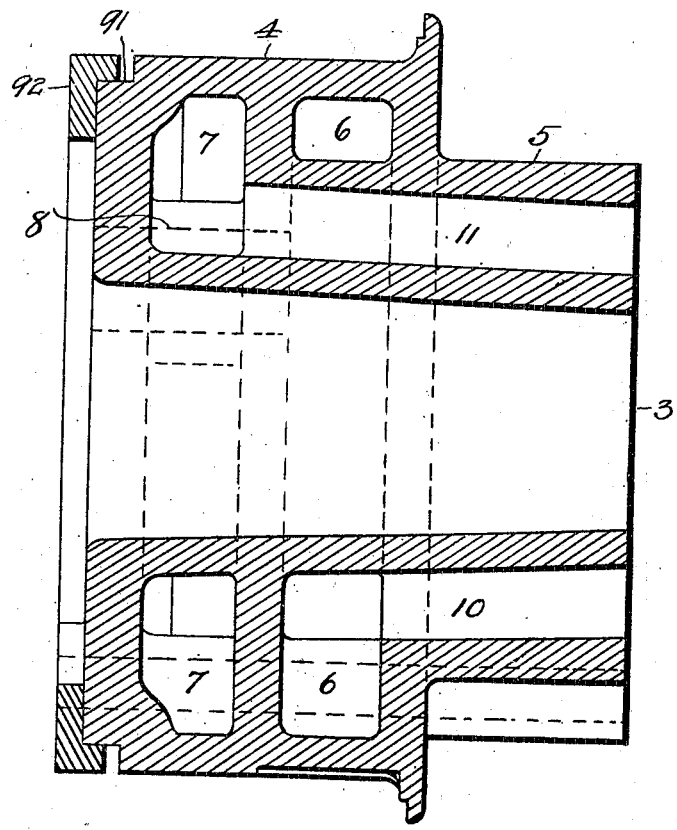
Figure 10:
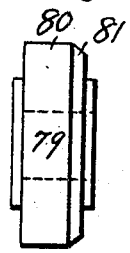
Figure 11:
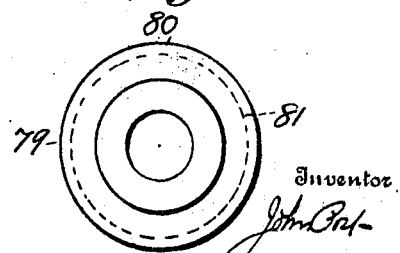

Figure 1 is a view in section of a car-wheel, showing my motor in position; Fig. 2, a plan view of the motor, the front of the car-wheel being broken away; Fig. 3, a plan view of the spider or foundation of my motor; Fig. 4, a detail view, on an enlarged scale, of the shifting mechanism for controlling the speed of the motor; Fig. 5, a longitudinal sectional view of one of the valve-casings and valves; Fig. 6, an end view, on an enlarged scale, of the hub; Fig. 7, a longitudinal sectional view of the hub shown in Fig. 6; Figs. 8 and 9, detail views of one of the cams for controlling the action of the steam-valves; Figs. 10 and 11, detail views of one of the rollers; Fig. 12, a detail view of one of the valve-operating cams; and Fig. 13 a plan view, on a reduced scale, of the compression-ring.

In the drawings similar reference characters indicate corresponding parts throughout the several views.

In Fig. 1 is shown a cross-section of a wheel containing one of my improved motors mounted on the spindle 1 of the axle 2, in which 3 represents a hub secured to the inner end of spindle 1, having its inner end 4 much larger than its outer end 5. Two annular channels 6 and 7 are cut into the portion 4 and connected by means of pipes 8 and 9, respectively, with a suitable throttle-valve. (Not shown.) Connected with each channel 6 and 7 are channels running longitudinally of the hub 3 and more particularly its smaller outer end 5, said channels being designated 10 where connected with the live-steam channel 6, and 11 where connected with the exhaust-channel 7. Toward the outer end of spindle 1 is mounted the central tubular portion 12 of what I designate as the "spider" of my motor, the outer surface of said tubular portion 12 being cylindrical, as shown at 13, at its outer portion and secured to spindle 1 by means of key 14 or any other suitable fastening means.

Referring particularly to Figs. 2, 3, and 4, 15 represents the web portion of the spider of my motor, which is cast integral with the inner end of the tubular portion 12. The web portion 15 is substantially circular in contour with three arms (designated 16) extending therefrom and intermediate of said arms bosses or projections 17, surrounding holes 18 and having laterally-projecting threaded holes 19 extending outwardly to a flattened surface 20.

On each arm 16 is formed one of the component parts of my motor, which, as all the parts are the same, the description of one will suffice for all of the arms.

21 represents a cylinder at the outer end of each arm, and at substantially right angles thereto are provided journal-bearings 22 and 23, in which is mounted a crank-shaft 24. The piston 21ª in cylinder 21 is connected by means of piston-rod 25 with the crank-shaft 24 in the adjacent bearings.

26 represents one element of the valve-casing, which is positioned on top of and at one side of cylinder 21 and has its longitudinal diameter at an acute angle to the longitudinal diameter of the cylinder aforesaid. Said valve-casing 26 is provided with three laterally-extending apertures, the central one of which (designated 27) is connected with the closed end of cylinder 21 by means of duct 28. The end aperture 29 is connected, by means of channel 30, with the outlet to channel 10, while the other end aperture 31 is connected, by means of channel 32, with the outlet to channel 11, said channels 30 and 32 extending through arm 16, as shown in dotted lines in Fig. 2. A flange 33 extends around the part 26, having stud-bolts 34 secured in holes 35 therein.

36 represents the top of the valve-casing, having holes 37 therein to receive the stud-bolts 34 and held in place by means of nuts 38.

39 represents a tubular portion extending from the end of the top 36 and provided with screw-threads 40 on its outer end, on which is secured a head-nut 41 and a clamping-nut 42.

The valve-piston 53 is of the triple-bearing-surface class, having its central surface 44 of sufficient width to at times cover the central port 27, while the end surfaces 45 form steamways 46 and 47, connecting the central port 27 with the live-steam port 29 and the exhaust-port 31, respectively.

48 represents a bearing-surface on the inner side of the top of casing 36, while 49 represents a bearing-plate engaging said bearing-surface 48, and 50 a bow-spring secured to the middle of piston 43 by means of screw 51 and engaging plate 49 to hold it in engagement with surface 48.

The ends of the top of piston 43 are formed with flanges 52, while the ends of plate 49 have diametrically-extending flanges 53, that engage said flanges 52.

Piston-rod 53ª is secured to the end of piston 43 and is slidably mounted in tubular portion 39 and head-nut 41 and is formed with screw-threads 54 on its free end, on which is secured a flanged head-nut 55 and a clamping-nut 56.

57 represents an expansible coil-spring bearing against the inner surface of flanged head-nut 55 and the end of the valve-casing. The function of the coil-spring 57 is to normally hold the valve-piston so that the port 27 is in communication with the port 31 when the valve is not actuated by the mechanism hereinafter described.

58 represents a ring slidably mounted on the cylindrical portion 13, being held in position by a flange 59 on the inner end of said cylindrical portion 13 and a ring 60, secured to cylindrical portion 13 by means of screws 61 or other suitable securing means. The outer surface of ring 58 is formed with a spur-gear face 62.

63 represents a shaft journaled in hub 3 and one of the arms 16 and having a gear-pinion 64 keyed to its inner end and meshing with the gear-face 62, the outer end of shaft 63 being connected with any suitable operating mechanism. (Not shown.)

65 represents screw-shafts secured in holes 18 by means of set-screws 66, inserted in threaded holes 19.

67 represents an interiorly-threaded sleeve mounted on each screw-shaft 65 and having its inner end formed with gear-teeth 68, that mesh with gear-face 62.

69 represents an arm revolubly mounted on sleeve 67, being held in position by means of threaded nut 70, secured on threaded end 71 of said sleeve.

72 represents a cam keyed to the outer end of each crank-shaft 24, having its throw portion 73 formed with two bearing-surfaces, of which the bearing-surface 74 is at a greater distance from the center of shaft 24 than the surface 75, while 76 represents a beveled surface connecting the two surfaces 74 and 75.

The arm 69 extends outwardly from the sleeve 67 to avoid the journal-bearing 22 and has its outer end formed with a flat surface 77, that engages the end of head-nut 55 and opposite to said flat surface arms 78, between which are journaled a roller 79, having a flat surface 80 adapted to travel on cam 72 and surfaces 74 and 75 of throw portion 73, and a beveled surface 81 to move on beveled surface 76.

The part of my motor just described operates my valve-piston 43, it being understood that as the shaft 24 revolves the arm 69 swings on sleeve 67, actuated by cam 72 against the resilience of spring 57, thus sliding the valve so as to alternately open port 27 to connection with port 29 and port 31. When the sleeve 69 is in its outermost position, so that the roller 79 travels on surface 75, the throw of the valve-piston is limited, so that but a small quantity of steam enters the cylinder and the motor travels at a reduced speed. By rotating shaft 63 in the proper direction the gear-pinion 64 thereon slides the ring 58 by meshing with its gear-face 62, which in turn meshing with the gear-teeth 68 on the sleeves 67 rotates them. The threads on shaft 65 engaging the threads on the inner surfaces of sleeves 67 causes them to slide back on said shafts 65. As the sleeves are drawn back the beveled surfaces 81 of the rollers 79 travel on the beveled surfaces 76 of the cams 72, which causes a greater throw of the valve-piston 43 during each revolution of the cams and a consequent increase in the quantity of steam admitted to the cylinders and an increased speed to the motor until the roller travels on the surface 74, when the greatest speed is attained.

82 represents one part of the wheel-casing, which is shown to be a car-wheel with the tread portion 83 and flange 84. The casing is hollowed out to receive the motor described above and is provided with a back wall 85 and an offset portion 86, forming an annular chamber 87, in which are placed antifriction-bearings of any preferred form, the form shown in the drawings being roller-bearings slightly conical in shape and angularly mounted, but are intended for illustration only. The rear wall 88 of offset 86 is provided with a bearing-surface 89, which rides on a packing-ring 90, secured in an annular recess 91 in hub 3, said packing-ring being held in position by a compression-ring 92, secured to the rear-face of hub 3. 93 represents the front plate of my wheel-casing, having a flanged recess 94 to receive an inwardly-projecting flange 95 on the front part 82 and secured thereto by bolts and nuts 96. 97 represents a cylindrical chamber formed in the center of plate 93 and surrounding the end of axle-spindle 1, in which is also mounted antifriction-bearings, shown as of the same type as those in chamber 87, though any other form may be substituted therefor, if desired. The front of cylindrical chamber 97 is provided with a recess 98 to receive the nut 99 and washer 100 on the end of the shaft. It will be understood that by this construction of wheel-casing the interior is oil-proof, so that it may be partially or entirely filled with oil which will automatically lubricate the bearings.

101 represents an annular flange formed on the inside of the back wall 85, on which is secured a ring 102, having inwardly-projecting gear-teeth 103.

104 represents gear-pinions secured on the inner ends of crank-shafts 24 and meshing with gear-teeth 103.

It will be understood that the wheel-casing consisting of the parts 82 and 93 is the only part that rotates and that such rotation is on the antifriction-bearings contained in chambers 87 and 97, the balance of the parts above described being rigidly secured to the axle-spindle 1, and that such rotation is caused by the gear-pinions 104 meshing with the gear-teeth 103.

The pistons 21ª in the cylinders 21 of the three engines comprising my motor being set originally so that they are driven in turn and so that power is being applied to at least one of the three at all times, the jolting and jarring incident to the working of a reciprocating engine is avoided, and at the same time the pistons in the cylinders that are exhausting are returned to the proper position for the action of the live steam.

The springs 51 by normally holding the valve-pistons 43 in position to exhaust act as safety devices to prevent the collection of steam and water of condensation in the cylinders.

In the description of the steam-channels 10 and 11 and 30 and 32 I have stated that channels 10 and 30 are connected with the live-steam inlet, while 11 and 32 are connected with the exhaust. This is true when the wheel is being propelled forward; but when it is desired to back it the steam is sent through channels 11 and 32, while channels 10 and 30 become for the time being the exhaust-conduits, this direction of the steam being controlled by means of a valve mechanism connected with pipes 8 and 9. (Not shown.)

I have described the motor in one wheel only; but it will be understood that a motor is provided in the wheel at the other end of the axle 2 and that, if desired, more than one pair of motors may be applied to the vehicle, the number being limited only to the number of wheels secured to the vehicle; also, that my motor is applicable to other vehicles than railway-cars—such as motor-vehicles, passenger-omnibuses, sight-seeing trams, &c.—the tread of the wheel being altered to suit the style of vehicle and not being an essential part of my invention.

Having thus described my invention, what I claim is—

1. A motor for wheeled vehicles contained in the vehicle-wheels, and secured to the axles, and the wheel-casings operatively connected with the motors to rotate the casings relatively thereto, substantially as shown and described.

2. In combination with the axle of a vehicle, a motor keyed thereto, a wheel-casing inclosing said motor and having a gear secured thereto, and gear-pinions operatively connected to said motor and meshing with the gear secured to the casing so that the casing is rotated relative to the motor, substantially as shown and described.

3. In combination with the axle of a vehicle, a motor secured thereto, a wheel-casing inclosing said motor, and operative connections between said motor and wheel-casing to rotate the casing relative to said motor, substantially as shown and described.

4. In combination with the axle of a vehicle, a motor comprising a plurality of reciprocating steam-engines secured to said axle and connected together for unitary action, a wheel-casing inclosing said motor, and operative connections between said motor and wheel-casing to rotate said casing relative to said motor, substantially as shown and described.

5. In combination with the axle of a vehicle, a motor comprising a plurality of reciprocating steam-engines arranged around said axle, a wheel-casing inclosing said motor, and operative connections between said motor and wheel-casing to rotate said casing relative to said motor, substantially as shown and described.

6. In combination with the axle of a vehicle, a plurality of reciprocating steam-engines having the longitudinal axes of their cylinders annularly arranged around said axle, said engines connected together for unitary action, a wheel-casing inclosing said motor, and operative connections between said motor and wheel-casing to rotate said casing relative to said motor, substantially as shown and described.

7. In combination with the axle of a vehicle, a motor comprising a plurality of reciprocating steam-engines secured to said axle and connected together for unitary action, a wheel-casing inclosing said motor, a gear-face secured to said casing, and gear-pinions meshing with said gear-face and operatively connected with said steam-engines, substantially as shown and described.

8. In combination with the axle of a vehicle, a plurality of reciprocating steam-engines having the longitudinal axes of their cylinders annularly arranged around and secured to said axle, said engines being connected together for unitary action, a wheel-casing inclosing said motor, a gear-face secured to said casing, and gear-pinions meshing with said gear-face and operatively connected with said steam-engines, substantially as shown and described.

9. In combination with a reciprocating valve having a stem, a pivoted arm for actuating said valve, a cam for operating said arm having two bearing-surfaces at different distances from the center of the cam, and a beveled surface connecting said bearing-surfaces, means to actuate said arms so that the end engaging the cam travels from one of said bearing-surfaces to the other over said beveled face, substantially as shown and described.

10. In combination with a reciprocating valve having a stem, a threaded shaft, a gear-pinion mounted on said threaded shaft, an arm pivotally mounted on said pinion, said arm bearing against the valve-stem, a cam for operating said arm having two bearing-surfaces at different distances from the center of the cam; and beveled surfaces connecting said bearing-surfaces, and a gear-rack meshing with said pinion to actuate said arm on the screw-shaft to move the end of the arm engaging the cam transversely across it, substantially as shown and described.

11. A valve-operating mechanism for steam-engines comprising a reciprocating valve-piston, a rod secured to said valve-piston, a flanged head-nut on the end of said rod, an expansible coil-spring bearing against said flanged nut, an arm suitably journaled and bearing against said head-nut, and means to actuate said arm and rod against the resistance of said spring, substantially as shown and described.

12. A valve-operating mechanism for steam-engines comprising in combination with the crank-shaft, a cam keyed to one end thereof, and a valve-casing containing a reciprocating valve-piston, a rod secured to said valve-piston, an arm suitably journaled and bearing against the end of said rod, and a roller journaled in said arm and arranged to travel on the surface of the cam, substantially as shown and described.

13. A valve-operating mechanism for steam-engines, comprising in combination with the crank-shaft, a cam keyed to one end thereof, and a valve-casing containing a reciprocating valve-piston, a rod secured to said valve-piston, a flanged head-nut secured to the end of said rod, an expansible coil-spring bearing between said head-nut and valve-casing, an arm suitably journaled and bearing against the end of said rod, and a roller journaled in said arm and arranged to travel on the surface of the said cam, substantially as shown and described.

14. A valve-operating mechanism for steam-engines comprising in combination with the crank-shaft, a cam keyed to one end thereof having its throw portion formed with two flat surfaces at different distances from the center of the shaft and an inclined surface connecting said flat surfaces, a valve-casing containing a reciprocating valve-piston, a rod secured to said valve-piston, an arm suitably journaled and bearing against the end of said rod, a roller journaled in said arm and having a flat surface adapted to travel on the flat surfaces of the cam and a beveled surface to travel on the inclined surface thereof, and means to move said arm longitudinally, substantially as shown and described.

15. A valve-operating mechanism for steam-engines comprising in combination with the crank-shaft, a cam keyed to one end thereof having its throw portion formed with two flat surfaces at different distances from the center of the shaft and an inclined surface connecting said flat surfaces, a valve-casing containing a reciprocating valve-piston, a rod secured to said valve-piston, a flanged head-nut secured on the end of said rod, an expansible coil-spring bearing between said head-nut and valve-casing, an arm suitably journaled and bearing against the end of said rod, a roller journaled in said arm and having a flat surface adapted to travel on the flat surfaces of the cam and a beveled surface to travel on the inclined surface thereof, and means to move said arm longitudinally, substantially as shown and described.

16. A valve-operating mechanism for steam-engines comprising in combination with the crank-shaft, a cam keyed to one end thereof having its throw portion formed with two flat surfaces at different distances from the center of said shaft and an inclined surface connecting said flat surfaces, a valve-casing containing a reciprocating valve-piston, a rod secured to said valve-piston, a screw-shaft suitably secured, an interiorly-screw-threaded sleeve mounted on said shaft, an arm journaled on said sleeve and bearing against the valve-piston rod, a roller journaled in said arm and having a flat surface to travel on the flat surfaces of the cam and a beveled surface to travel on the inclined surface thereof, and means to rotate the sleeve on said shaft to move said arm longitudinally, substantially as shown and described.

17. A valve-operating mechanism for steam-engines comprising in combination with the crank-shaft, a cam keyed to one end thereof having its throw portion formed with two flat surfaces at different distances from the center of said shaft and an inclined surface connecting said flat surfaces, a valve-casing containing a reciprocating valve-piston, a rod secured to said valve-piston, a flanged head-nut secured on the end of said rod, an expansible coil-spring bearing between said head-nut and the valve-casing, a screw-shaft suitably secured, an interiorly-screw-threaded sleeve mounted on said shaft, an arm journaled on said sleeve and bearing against the valve-piston rod, a roller journaled in said arm and having a flat surface to travel on the flat surfaces of the cam and a beveled surface to travel on the inclined surface thereof, and means to rotate the sleeve on said shaft to move said arm longitudinally, substantially as shown and described.

18. A valve-operating mechanism for steam-engines comprising in combination with the crank-shaft, a cam keyed to one end thereof having its throw portion formed with two flat surfaces at different distances from the center of said shaft and an inclined surface connecting said flat surfaces, a valve-casing containing a reciprocating valve-piston, a rod secured to said valve-piston, a screw-shaft suitably secured, an interiorly-threaded sleeve mounted on said shaft and provided with gear-teeth on its outer surface, a sliding rack meshing with said gear-teeth, means to actuate said rack, an arm journaled on said sleeve and bearing against the valve-piston rod, and a roller journaled in said arm and provided with a flat surface to travel on the flat surfaces of said cam and a beveled surface to travel on the inclined surface thereof, substantially as shown and described.

19. A valve-operating mechanism for steam-engines comprising in combination with the crank-shaft, a cam keyed to one end thereof having its throw portion formed with two flat surfaces at different distances from the center of said shaft and an inclined surface connecting said flat surfaces, a valve-casing containing a reciprocating valve-piston, a rod secured to said valve-piston, a flanged head-nut secured on the end of said rod, an expansible coil-spring bearing between said head-nut and the valve-casing, a screw-shaft suitably secured, an interiorly-screw-threaded sleeve mounted on said shaft, an arm journaled on said sleeve and bearing against the valve-piston rod, a roller journaled in said arm and having a flat surface to travel on the flat surfaces of the cam and a beveled surface to travel on the inclined surface thereof, and means to rotate the sleeve on the said shaft to move said arm longitudinally, substantially as shown and described.

20. In combination with a wheel-axle, a motor comprising a plurality of reciprocating steam-engines having the longitudinal axes of their cylinders annularly arranged around said axle, shafts suitably journaled and operatively connected with said engines, a spur-pinion keyed to each shaft, a wheel-casing inclosing said motor and adapted to rotate relative thereto, and an annular rack secured to said casing and meshing with said spur-pinions, substantially as shown and described.

21. In combination with a wheel-axle, a motor secured thereto comprising a plurality of steam-engines, shafts suitably journaled and operatively connected with said engines, a cam keyed to one end of each shaft and a spur-pinion keyed to the other end, a reciprocating valve-piston for controlling the steam-valve of each engine, a rod secured to each valve-piston, arms suitably journaled and bearing against the valve-rods, a roller journaled on each arm and adapted to travel on one of said cams, a wheel-casing inclosing said motor and adapted to rotate relative thereto, and an annular rack secured to said casing and meshing with said spur-pinions, substantially as shown and described.

22. In combination with a wheel-axle, a motor secured thereto comprising a plurality of steam-engines, shafts suitably journaled and operatively connected with said engines, a cam keyed to one end of each shaft and a spur-pinion keyed to the other end, a reciprocating valve-piston for controlling the steam-valve of each engine, a rod secured to each valve-piston, a flanged head-nut on the end of each rod, an expansible coil-spring bearing against said head-nut, arms suitably journaled and bearing against said head-nut, a roller journaled in each arm and adapted to travel on one of said cams, a wheel-casing inclosing said motor and adapted to rotate relative thereto, and an annular rack secured to said casing and meshing with said spur-pinions, substantially as shown and described.

23. In combination with a wheel-axle, a motor secured thereto comprising a plurality of steam-engines, shafts suitably journaled and operatively connected with said engines, a cam keyed to one end of each shaft and a spur-pinion keyed to the other end, the throw portion of each cam having two flat surfaces at different distances from the center of the shaft and an inclined surface connecting said flat surfaces, a reciprocating valve-piston for controlling the steam-valve of each engine, a rod secured to each valve-piston, arms suitably journaled and bearing against the valve-rods, a roller journaled in each arm having a flat surface to travel on the flat surfaces of the said cam and a beveled surface to travel on said inclined surface, means to simultaneously move said arms longitudinally, a wheel-casing inclosing said motor and adapted to rotate relative thereto, and an annular rack secured to said casing and meshing with said spur-pinions, substantially as shown and described.

24. In combination with a wheel-axle, a motor secured thereto comprising a plurality of steam-engines, shafts suitably journaled and operatively connected with said engines, a cam keyed to one end of each shaft and a spur-pinion keyed to the other end, the throw portion of each cam having two flat surfaces at different distances from the center of the shaft and an inclined surface connecting said flat surfaces, a reciprocating valve-piston for controlling the steam-valve of each engine, a rod secured to each valve-piston, a flanged head-nut on the end of each rod, an expansible coil-spring bearing against said head-nut, arms suitably journaled and bearing against said head-nuts, a roller journaled in said arms and having a flat surface to travel on the flat surfaces of the cam and a beveled surface to travel on the inclined surface thereof, and means to rotate the sleeve on the said shaft to move said arms longitudinally, substantially as shown and described.

25. In combination with a wheel-axle, a motor secured thereto comprising a plurality of steam-engines, shafts suitably journaled and operatively connected with said engines, a cam keyed to one end of each shaft and a spur-pinion keyed to the other end, the throw portion of each cam having two flat surfaces at different distances from the center of the shaft and an inclined surface connecting said flat surfaces, a reciprocating valve-piston for controlling the steam-valve of each engine, a rod secured to each valve-piston, screw-shafts suitably secured, an interiorly-threaded sleeve mounted on each shaft, an arm journaled on each sleeve and bearing against one of said valve-rods, a roller journaled in each arm having a flat surface to travel on the flat surfaces of said cam and a beveled surface to travel on said inclined surface, means to simultaneously rotate said sleeves to move said arms longitudinally, a wheel-casing inclosing said motor and adapted to rotate relative thereto, and an annular rack secured to said casing and meshing with said spur-pinions, substantially as shown and described.

26. In combination with a wheel-axle, a motor secured thereto comprising a plurality of steam-engines, shafts suitably journaled and operatively connected with said engines, a cam keyed to one end of each shaft and a spur-pinion keyed to the other end, the throw portion of each cam having two flat surfaces at different distances from the center of the shaft and an inclined surface connecting said flat surfaces, a reciprocating valve-piston for controlling the steam-valve of each engine, a rod secured to each valve-piston, a flanged head-nut on the end of each rod, an expansible coil-spring bearing against said head-nut, screw-shafts suitably secured, an interiorly-threaded sleeve mounted on each shaft, an arm journaled on each sleeve and bearing against one end of said head-nuts, a roller journaled in each arm having a flat surface to travel on the flat surfaces of said cam and a beveled surface to travel on said inclined surface, means to simultaneously rotate said sleeves to move said arms longitudinally, a wheel-casing inclosing said motor and adapted to rotate relative thereto, and an annular rack secured to said casing and meshing with said spur-pinions, substantially as shown and described.

27. In combination with a wheel-axle, a motor secured thereto comprising a plurality of steam-engines, shafts suitably journaled and operatively-connected with said engines, a cam keyed to one end of each shaft and a spur-pinion keyed to the other end, the throw portion of each cam having two flat surfaces at different distances from the center of the shaft and an inclined surface connecting said flat surfaces, a reciprocating valve-piston for controlling the steam-valve of each engine, a rod secured to each valve-piston, screw-shafts suitably secured, an interiorly-threaded sleeve mounted on each shaft, an arm journaled on each sleeve and bearing against one of said valve-rods, a roller journaled in each arm having a flat-surface to travel on the flat surfaces of said cam and a beveled surface to travel on said inclined surface, the surface of said sleeves being provided with gear-teeth, a gear-rack meshing with said gear-teeth, a wheel-casing inclosing said motor and adapted to rotate relative thereto, and an annular rack secured to said casing and meshing with said spur-pinions, substantially as shown and described.

28. In combination with a wheel-axle, a motor secured thereto comprising a plurality of steam-engines, shafts suitably journaled and operatively connected with said engines, a cam keyed to one end of each shaft and a spur-pinion keyed to the other end, the throw portion of each cam having two flat surfaces at different distances from the center of the shaft and an inclined surface connecting said flat surfaces, a reciprocating valve-piston for controlling the steam-valve of each engine, a rod secured to each valve-piston, a flanged head-nut on the end of each rod, an expansible coil-spring bearing against said head-nut, screw-shafts secured equidistant from said axle, an interiorly-threaded sleeve mounted on each shaft, an arm journaled on each sleeve and bearing against one of said head-nuts, a roller journaled in each arm having a flat surface to travel on the flat surfaces of said cam and a beveled surface to travel on said inclined surface, the surface of said sleeves provided with gear-teeth, means to actuate said rack to rotate said sleeves, a wheel-casing inclosing said motor and adapted to rotate relative thereto, an annular rack secured to said casing and meshing with said spur-pinions, substantially as shown and described.

In witness whereof I have hereunto set my hand in presence of two subscribing witnesses.

JOHN POST.

Witnesses:
E. B. SHAVER,
E. H. BOUCHER.